United States Patent
Lu et al.

(10) Patent No.: US 10,855,174 B2
(45) Date of Patent: Dec. 1, 2020

(54) POWER SUPPLY AND POWER SUPPLY METHOD WITH POWER SHARING AND OVERSHOOT PREVENTING

(71) Applicant: Monolithic Power Systems, Inc., San Jose, CA (US)

(72) Inventors: Ming Lu, San Jose, CA (US); Pengjie Lai, San Jose, CA (US); Jian Jiang, Los Gatos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 135 days.

(21) Appl. No.: 16/379,749

(22) Filed: Apr. 9, 2019

(65) Prior Publication Data

US 2019/0260291 A1    Aug. 22, 2019

Related U.S. Application Data

(63) Continuation-in-part of application No. 15/932,262, filed on Feb. 16, 2018, now Pat. No. 10,523,048.

(51) Int. Cl.
*H02M 3/04*    (2006.01)
*H02M 1/38*    (2007.01)
*H02M 3/158*   (2006.01)
*H02M 1/32*    (2007.01)
*H02M 1/00*    (2006.01)

(52) U.S. Cl.
CPC ............ *H02M 3/04* (2013.01); *H02M 1/32* (2013.01); *H02M 1/38* (2013.01); *H02M 3/1582* (2013.01); *H02M 2001/0009* (2013.01)

(58) Field of Classification Search
CPC .. H02M 2001/0009; H02M 1/38; H02M 1/32; H02M 3/04; H02M 3/1582
See application file for complete search history.

(56) References Cited

U.S. PATENT DOCUMENTS

| | | | |
|---|---|---|---|
| 8,643,351 B2 | 2/2014 | Lai et al. | |
| 8,693,276 B2 | 4/2014 | Lai et al. | |
| 9,734,917 B2 | 8/2017 | Wang et al. | |
| 9,899,834 B1 | 2/2018 | Mayo | |
| 9,946,279 B1* | 4/2018 | Dinh | H03K 5/08 |
| 9,998,009 B1 | 6/2018 | Lai et al. | |
| 10,090,675 B1 | 10/2018 | Lam et al. | |
| 10,523,048 B2 | 12/2019 | Lai et al. | |

(Continued)

OTHER PUBLICATIONS

U.S. Appl. No. 15/425,820, filed Feb. 6, 2017, Monolithic Power Systems.

(Continued)

*Primary Examiner* — Jared Fureman
*Assistant Examiner* — Duc M Pham
(74) *Attorney, Agent, or Firm* — Perkins Coie LLP

(57) ABSTRACT

A power supply covering power sharing and overshoot preventing functions. In the power supply, a first eFuse is used to deliver a first input power source to a first load at a first bus terminal, and a second eFuse is used to deliver a second input power source to a second load at a second bus terminal. When the current flowing through one eFuse hits its current limit threshold, the other input power source kicks in to provide power support. The current limit threshold of each eFuse is set to be lower than its maximum rated current.

20 Claims, 8 Drawing Sheets

(56) References Cited

U.S. PATENT DOCUMENTS

| | | | |
|---|---|---|---|
| 2008/0104551 A1* | 5/2008 | Ouellette | G11C 17/18 |
| | | | 716/132 |
| 2015/0171665 A1 | 6/2015 | Humphrey et al. | |
| 2017/0005571 A1* | 1/2017 | Wang | G06F 13/4081 |
| 2017/0186495 A1* | 6/2017 | Yang | G11C 17/18 |
| 2018/0069394 A1* | 3/2018 | Hagen | G01R 21/133 |
| 2019/0260224 A1 | 8/2019 | Lai et al. | |
| 2019/0260226 A1 | 8/2019 | Lu et al. | |

OTHER PUBLICATIONS

U.S. Appl. No. 15/932,262, filed Feb. 16, 2018, Monolithic Power Systems.

U.S. Appl. No. 16/372,391, filed Apr. 1, 2019, Monolithic Power Systems.

* cited by examiner

US 10,855,174 B2

POWER SUPPLY AND POWER SUPPLY METHOD WITH POWER SHARING AND OVERSHOOT PREVENTING

CROSS-REFERENCE TO RELATED APPLICATION

This application is a continuation-in-part of U.S. patent application Ser. No. 15/932,262, filed on Feb. 16, 2018, which is hereby incorporated by reference.

FIELD

The present invention relates to electronic circuits, more specifically, the present invention relates to power supply and the method thereof.

BACKGROUND

For high end enterprise solid state drive, for example, SAS SSD and PCLE Card, two input power sources are available for system energy consumption. In the traditional architecture, the input power sources are utilized independently. Thus, when one of the input powers hits its limit, the system cannot consume more power than the limit, which limits the system performance. Power back up function is also required for most enterprise solid state drives. Existing solution couples power back up circuit to one power input source, so if there are several power domains (several loads) that need the backup function, the power domains have to be coupled to this power input source, which further limits the system performance.

Thus, an improved power supply is needed.

SUMMARY

It is an object of the present invention to provide an improved power supply, which covers both power sharing and overshoot preventing functions.

In accomplishing the above and other objects, there has been provided, in accordance with an embodiment of the present invention, a power supply, comprising: a first eFuse, configured to deliver a first input power source to a first bus terminal, to provide a first bus voltage, wherein the first eFuse has a maximum rated current; a second eFuse, configured to deliver a second input power source to a second bus terminal, to provide a second bus voltage, wherein the second eFuse has a maximum rated current; a power sharing converter, coupled between the first bus terminal and the second bus terminal, to selectively provide an electrical path between the first bus terminal and the second bus terminal; and a controller, configured to control the first eFuse, the second eFuse and the power sharing converter in response to a current flowing through the first eFuse; wherein if the current flowing through the first eFuse hits a first current limit threshold, the second input power source kicks in via the power sharing converter to provide power support, wherein the first current limit threshold is lower than the maximum rated current of the first eFuse.

In addition, there has been provided, in accordance with an embodiment of the present invention, a method of controlling a power supply to supply power, wherein the power supply comprises a first eFuse configured to deliver a first input power source to a first load at a first bus terminal and a second eFuse configured to deliver a second input power source to a second load at a second bus terminal, and wherein the first eFuse and the second eFuse each has a maximum rated current, the method comprising: establishing an electrical path between the first bus terminal and the second bus terminal; enabling the power supplying from the second input power source to the first load through the electrical path if the current flowing through the first eFuse hits a first current limit threshold, wherein the first current limit threshold is lower than the maximum rated current of the first eFuse.

Furthermore, there has been provided, in accordance with an embodiment of the present invention, a method of controlling a power supply to supply power, wherein the power supply comprises a first eFuse configured to deliver a first input power source to a first load at a first bus terminal, and a second eFuse configured to deliver a second input power source to a second load at a second bus terminal, and wherein the first eFuse and the second eFuse each has a maximum rated current, the method comprising: establishing an electrical path between the first bus terminal and the second bus terminal; supplying power from the second input power source to the first load through the electrical path if the current flowing through the first eFuse hits a first current limit threshold, wherein the first current limit threshold is lower than the maximum rated current of the first eFuse.

The use of the similar reference label in different drawings indicates the same of like components.

DETAILED DESCRIPTION

Embodiments of circuits for power supplies are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
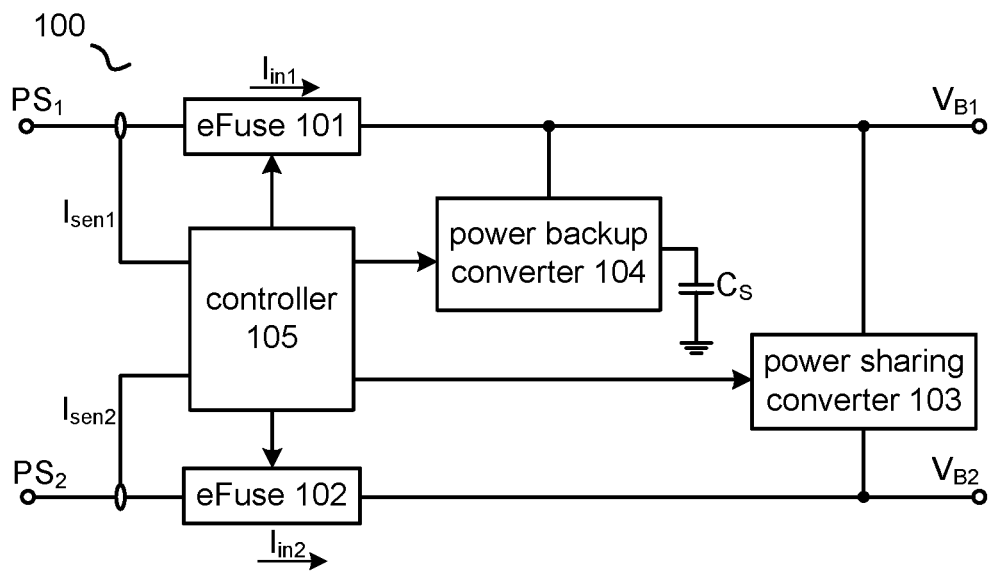
FIG. 1 schematically shows a power supply 100 in accordance with an embodiment of the present invention.

FIG. 1 schematically shows a power supply 100 in accordance with an embodiment of the present invention. In the example of FIG. 1, the power supply 100 comprises: a first eFuse 101, configured to deliver a first input power source PS1 to a first bus terminal, to provide a first bus voltage VB1; a second eFuse 102, configured to deliver a second input power source PS2 to a second bus terminal, to provide a second bus voltage VB2; a power sharing converter 103, coupled between the first bus terminal and the second bus terminal, to provide an electrical path between the first bus terminal and the second bus terminal; a power backup converter 104, coupled to the first bus terminal, to provide a charge path from the first bus terminal to a storage capacitor CS, and to provide a discharge path from the storage capacitor CS to the first bus terminal; and a controller 105, configured to control the first eFuse 101, the second eFuse 102, the power sharing converter 103 and the power backup converter 104 in response to a first sense signal Isen1 indicative of the first input power source PS1 and a second sense signal Isen2 indicative of the second input power source PS2.

In one embodiment, the first sense signal Isen1 indicates an input current of the first input power source PS1 (a current (Iin1) flowing through the first eFuse 101), and the second sense signal Isen2 indicates an input current of the second input power source PS2 (a current (Iin2) flowing through the second eFuse 102).

In the embodiment of FIG. 1, the power backup converter 104 is coupled to the first bus terminal. However, one of ordinary skill in the art should realize that the power backup converter 104 may also be coupled to the second bus terminal.

In one embodiment, the first input power source PS1 and the second input power source PS2 may be coupled together, and the first bus voltage VB1 and the second bus voltage VB2 may also be coupled together to supply a load (e.g. a downstream DC-DC converter, not shown). In other embodiments, the first bus voltage VB1 and the second bus voltage VB2 may not be coupled together and respectively supply a load.

In one embodiment, if one of the input currents hits a current limit threshold, the other input power source kicks in via the power sharing converter 103 to provide power support. For example, if a load coupled to the first bus terminal requires a high current, or more loads are coupled to the first bus terminal, causing the current flowing through the first eFuse 101 to hit its current limit threshold, the power sharing converter 103 will be active (triggered), so that the second input power source PS2 provides additional power to the first bus terminal.

In one embodiment, if one of the input power sources outage happens, the other input power source kicks in via the power sharing converter 103 to provide power support. That is, if the first input power source PS1 outage happens, the second input power source PS2 kicks in via the power sharing converter 103 to power the load that is coupled to the first bus terminal; or if the second input power source PS2 outage happens, the first input power source PS1 kicks in via the power sharing converter 103 to power the load that is coupled to the second bus terminal.

In one embodiment, either if both of the two input power sources outage happens, or one of the input power sources outage happens, the power backup converter 104 is active (triggered), to supply additional power to the load from the storage capacitor CS.

In one embodiment, if the power supplied by the first input power source PS1 and/or the second input power source PS2 is not enough for the load (e.g., the load steps up suddenly and lasts for a short time), the power backup converter 104 is active (triggered), to supply additional power to the load from the storage capacitor CS.

In one embodiment, the power backup converter 104 may support the load directly. In other embodiments, the power backup converter 104 may support the load by way of the power sharing converter 103.

Figure 2:
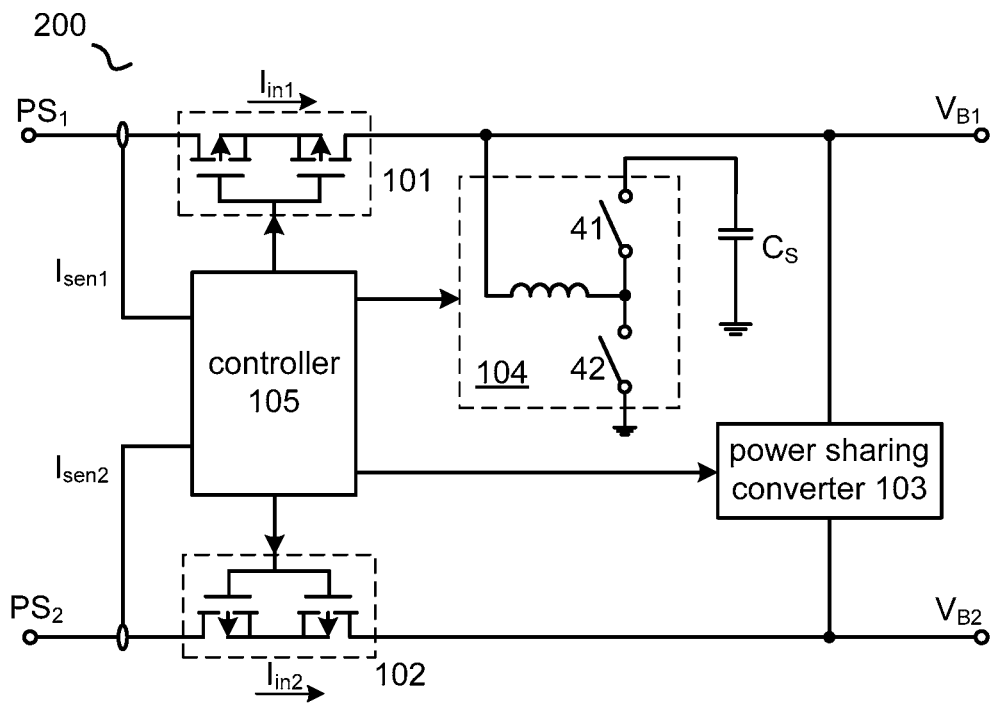
FIG. 2 schematically shows a power supply 200 in accordance with an embodiment of the present invention.

FIG. 2 schematically shows a power supply 200 in accordance with an embodiment of the present invention. In the example of FIG. 2, the first eFuse 101 and the second eFuse 102 each comprises a back to back switch to block reverse current; the power backup converter 104 comprises a bidirectional buck-boost converter.

Specifically, when the first input power source PS1 is plugged, it is delivered to the first bus terminal by way of the first eFuse 101. Then the storage capacitor CS is charged by periodically turning a high side switch 41 and a low side switch 42 on and off, until a voltage across the storage capacitor CS reaches a target voltage. If either both of the two input power sources outage happens, or the load consumes more power than the first input power source PS1 and/or the second input power source PS2 can provide (e.g., the two input currents both reach their current thresholds), the storage capacitor CS will be discharged through the power backup converter 104 to support the load.

Figure 3:
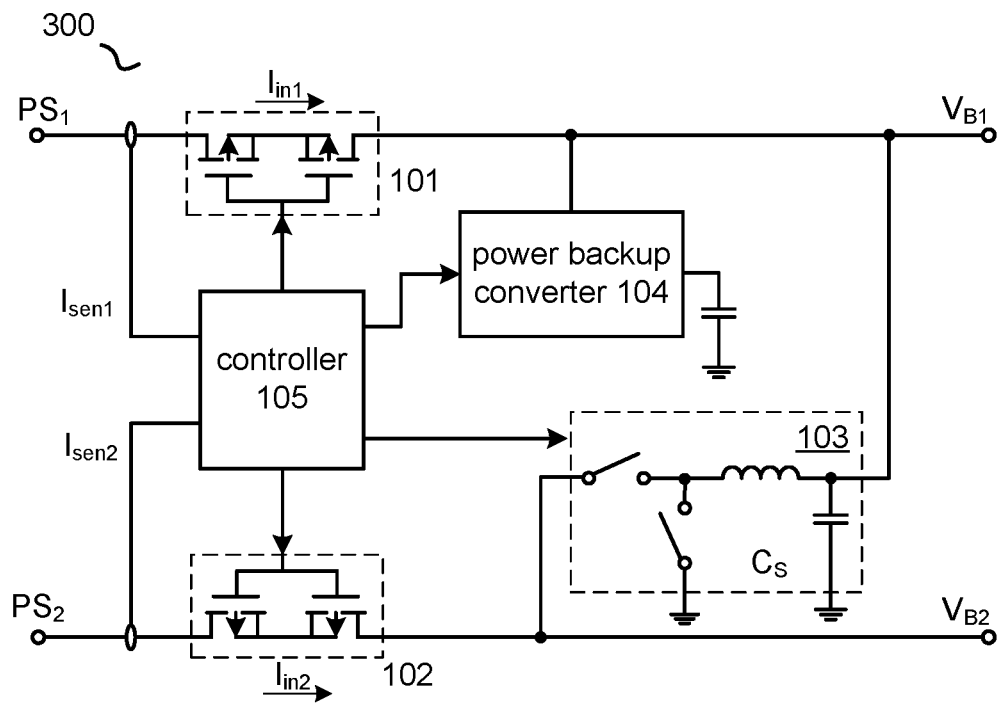
FIG. 3 schematically shows a power supply 300 with a circuit configuration of the power sharing converter 103 in accordance with an embodiment of the present invention.

FIG. 3 schematically shows a power supply 300 with a circuit configuration of the power sharing converter 103 in accordance with an embodiment of the present invention. In the example of FIG. 3, the power sharing converter 103 comprises a bidirectional buck-boost converter. For example, in one embodiment, if the first bus terminal is supported by the second bus voltage VB2, the power sharing converter 103 may operate as a buck converter to lower down the second bus voltage VB2 to the first bus voltage VB1. In another embodiment, if the second bus terminal is supported by the first bus voltage VB1, the power sharing converter 103 may operate as a boost converter to pump up the first bus voltage VB1 to the second bus voltage VB2.

Figure 4:
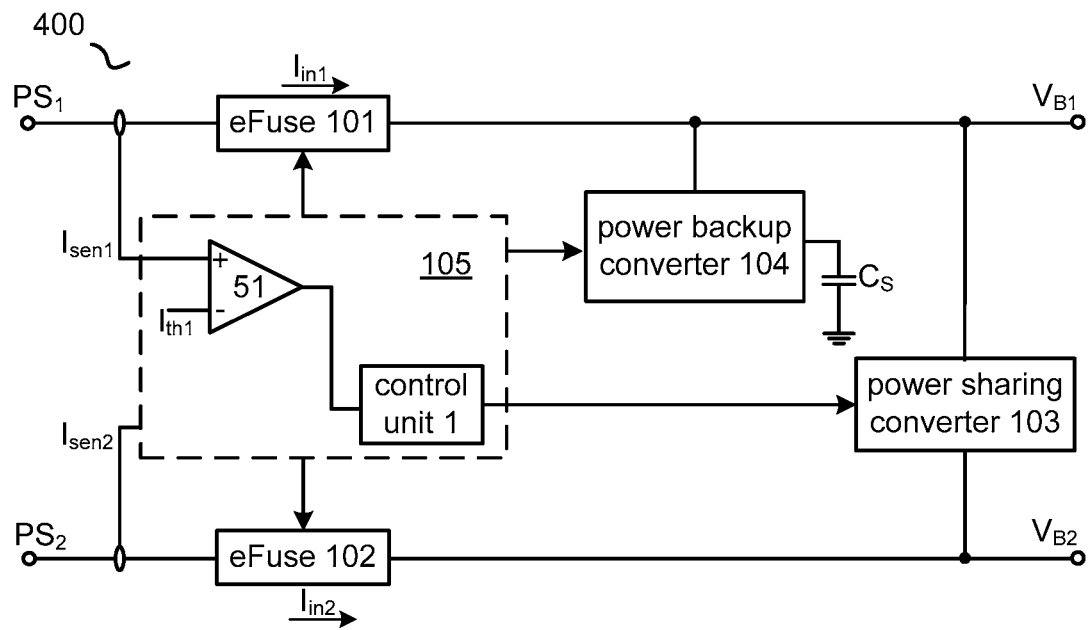
FIG. 4 schematically shows a power supply 400 with a controller 105 in accordance with an embodiment of the present invention.

FIG. 4 schematically shows a power supply 400 with a controller 105 in accordance with an embodiment of the present invention. In the example of FIG. 4, the controller 105 comprises: a first comparator 51, configured to compare the first sense signal Isen1 with a first current limit threshold ITH1; and a first control unit 1, configured to control the power sharing converter 103 in response to the comparison result of the first comparator 51. If the input current of the first input power source PS1 is higher than the first current limit threshold ITH1, which means the load coupled to the first bus terminal may require more power than set, the first control unit 1 will control the power sharing converter 103 to be active, so that the second power source PS2 will kick in to provide power support to the first bus terminal.

Figure 5:
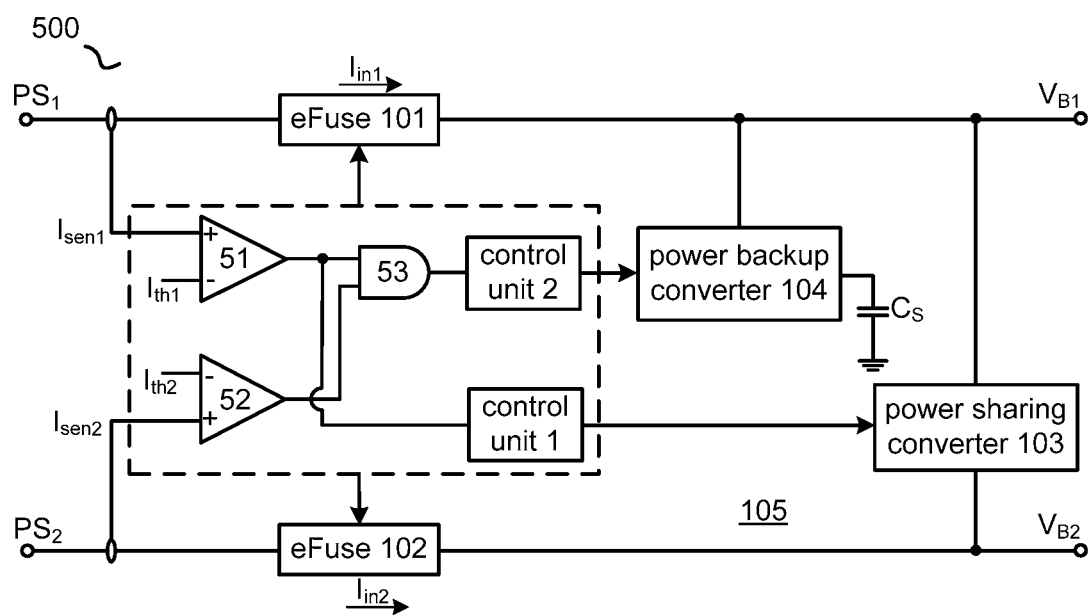
FIG. 5 schematically shows a power supply 500 with a controller 105 in accordance with an embodiment of the present invention.

FIG. 5 schematically shows a power supply 500 with a controller 105 in accordance with an embodiment of the present invention. In the example of FIG. 4, the controller

105 comprises: a first comparator 51, configured to compare the first sense signal Isen1 with a first current limit threshold Ith1; a second comparator 52, configured to compare the second sense signal Isen2 with a second current limit threshold Ith2; a logical AND unit 53, configured to execute a logical AND operation on the comparison results of the first and second comparators; a first control unit 1, configured to control the power sharing converter 103 in response to the comparison result of the first comparator 51; and a second control unit 2, configured to control the power backup converter 104 in response to the logical AND result of the logical AND unit 53.

If the input current of the first input power source PS1 and the second input power source PS2 is higher than the first current limit threshold Ith1 and the second current limit threshold Ith2, respectively, meaning that the power supplied by the first input power source PS1 and/or the second input power source PS2 is not enough for the load, the second control unit 2 will control the power backup converter 104 to be active, so that the storage capacitor CS may provide additional power support to the load.

In one embodiment, the power backup converter 104 may be enabled by detecting the first bus voltage VB1 or the second bus voltage VB2.

Figure 6:
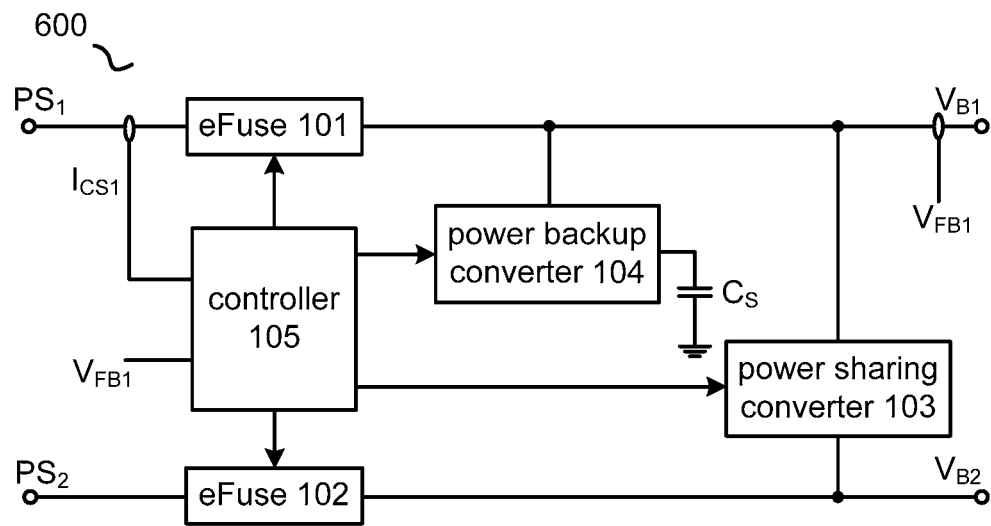
FIG. 6 schematically shows a power supply 600 in accordance with an embodiment of the present invention.

FIG. 6 schematically shows a power supply 600 in accordance with an embodiment of the present invention. In the example of FIG. 6, the power supply 600 comprises: a first eFuse 101, configured to deliver a first input power source PS1 to a first bus terminal, to provide a first bus voltage VB1; a second eFuse 102, configured to deliver a second input power source PS2 to a second bus terminal, to provide a second bus voltage VB2; a power sharing converter 103, coupled between the first bus terminal and the second bus terminal, to provide an electrical path between the first bus terminal and the second bus terminal; a power backup converter 104, coupled to the first bus terminal, to provide a charge path from the first bus terminal to a storage capacitor CS and to provide a discharge path from the storage capacitor CS to the first bus terminal under different situations; and a controller 105, configured to control the first eFuse 101, the second eFuse 102, the power sharing converter 103 and the power backup converter 104 in response to a current sense signal ICS1 indicative of a current flowing through the first eFuse 101 and a voltage feedback signal VFB1 indicative of the first bus voltage VB1.

In one embodiment, if the current flowing through the first eFuse 101 hits a current limit threshold, the second input power source PS2 kicks in by way of the power sharing converter 103 to provide power support.

During a startup process, when the first input power source PS1 is available and above an under voltage threshold, the storage capacitor CS is charged by the first input power source PS1 by way of the first eFuse 101.

If the voltage feedback signal indicates the first bus voltage VB1 drops, the storage capacitor CS kicks in by way of the power backup converter 104 to provide power support.

In one embodiment, the first eFuse 101 and the second eFuse 102 in the power supply 600 may each comprise a back to back switch to block reverse current as in the embodiments shown in FIGS. 2 & 3.

In one embodiment, the power backup converter 104 in the power supply 600 may comprise a bidirectional buck-boost converter as in the embodiment shown in FIG. 2; and the power sharing converter 103 in the power supply 600 may comprise a bidirectional buck-boost converter as in the embodiment shown in FIG. 3.

Figure 7:
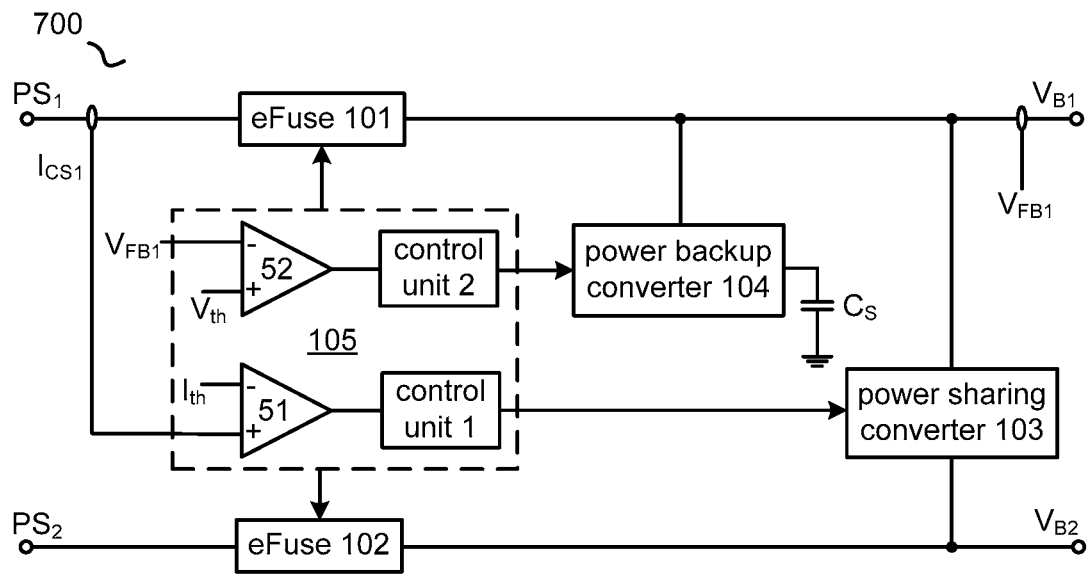
FIG. 7 schematically shows a power supply 700 with a circuit configuration of the controller 105 in accordance with an embodiment of the present invention.

FIG. 7 schematically shows a power supply 700 with a circuit configuration of the controller 105 in accordance with an embodiment of the present invention. In the example of FIG. 7, the controller 105 comprises: a first comparator 51, configured to compare the current sense signal ICS1 with a current limit threshold Ith; a first control unit 1, configured to control the power sharing converter 103 in response to the comparison between the current sense signal ICS1 and the current limit threshold Ith; a second comparator 52, configured to compare a voltage feedback signal VFB1 indicative of the first bus voltage VB1 with a release threshold Vth, to detect the voltage condition of the first bus voltage VB1; and a second control unit 2, configured to control the power backup converter 104 in response to the comparison between the voltage feedback signal VFB1 and the release threshold Vth.

If the current sense signal ICS1 is higher than the current limit threshold Ith1, which means the current flowing through the first eFuse 101 reaches its limit, the first control unit 1 will control the power sharing converter 103 to be active, so that the second input power source PS2 will kick in to provide power support to the first bus terminal.

If the voltage feedback signal VFB1 is lower than the release threshold Vth, which means that the first bus voltage VB1 drops, the second control unit 2 will control the power backup converter 104 to be active, so that the storage capacitor CS may provide additional power support to the load.

The drop of the first bus voltage VB1 may be caused by a sudden outage of the first input power source PS1 or a fast step-up of the load coupled to the first bus terminal.

Figure 8:
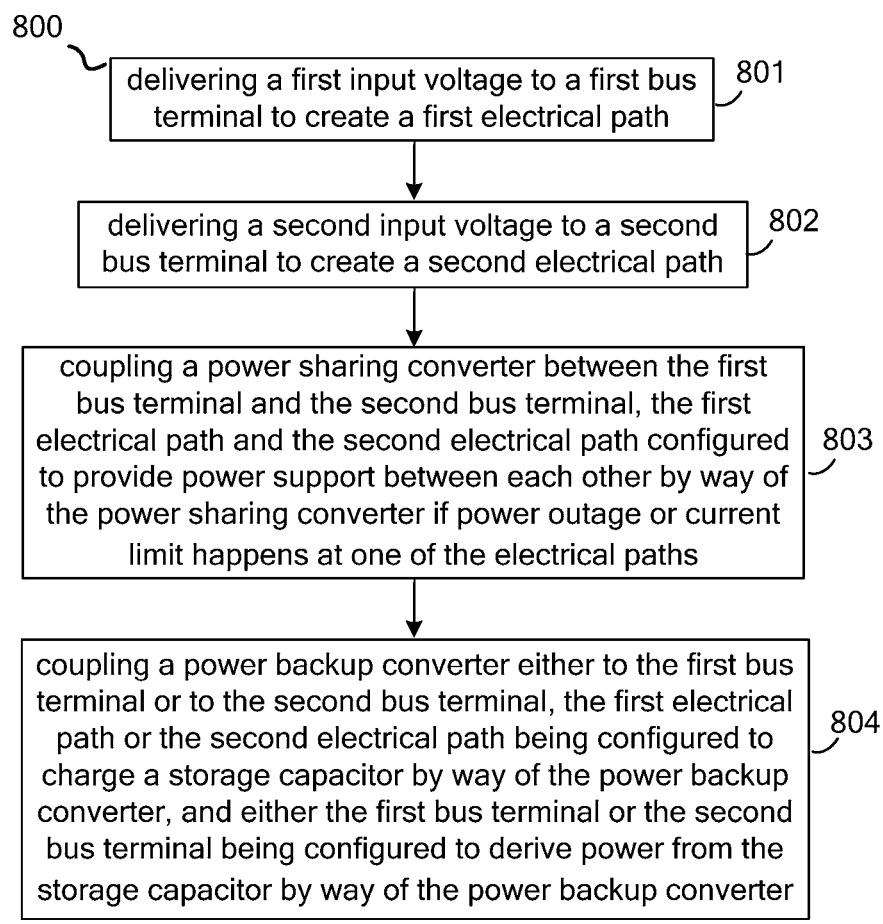
FIG. 8 schematically shows a flowchart 800 of a method used in a power supply in accordance with an embodiment of the present invention.

FIG. 8 schematically shows a flowchart 800 of a power supplying method in accordance with an embodiment of the present invention. The method comprising:

Step 801, delivering a first input voltage to a first bus terminal to create a first electrical path.

Step 802, delivering a second input voltage to a second bus terminal to create a second electrical path. The first electrical path and the second electrical path both supply a load (e.g., a downstream DC-DC converter).

Step 803, coupling a power sharing converter between the first bus terminal and the second bus terminal, the first electrical path and the second electrical path configured to provide power support between each other by way of the power sharing converter if power outage or current limit happens at one of the electrical paths. And Step 804, coupling a power backup converter either to the first bus terminal or to the second bus terminal, the first electrical path or the second electrical path being configured to charge a storage capacitor by way of the power backup converter, and either the first bus terminal or the second bus terminal being configured to derive power from the storage capacitor by way of the power backup converter.

In one embodiment, each of the first electrical path and the second electrical path is created by an eFuse.

In one embodiment, the power sharing converter and the power backup converter each comprises a bidirectional buck-boost converter.

In one embodiment, either if a current flowing through one of the electrical paths hits a current limit threshold, or if one of the input voltages outage happens, the other input voltage kicks in via the power sharing converter to provide power support.

In one embodiment, if both of the input voltages outage happens, the storage capacitor kicks in via the power backup converter to provide power support.

In one embodiment, if either one of the input voltages or both of the input voltages may not supply sufficient power, the storage capacitor kicks in via the power backup converter to provide power support.

Several embodiments of the foregoing power supply run in a more efficient and flexible way. Unlike the conventional technology, several embodiments of the foregoing power supply continue to consume power from the other input power source once one input power source hits the limit or outage happens. In addition, several embodiments of the foregoing power supply derive power from the storage capacitor if both of the input power sources drop, or if the power supplied by the input power source is not sufficient to drive the load.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

Figure 9:
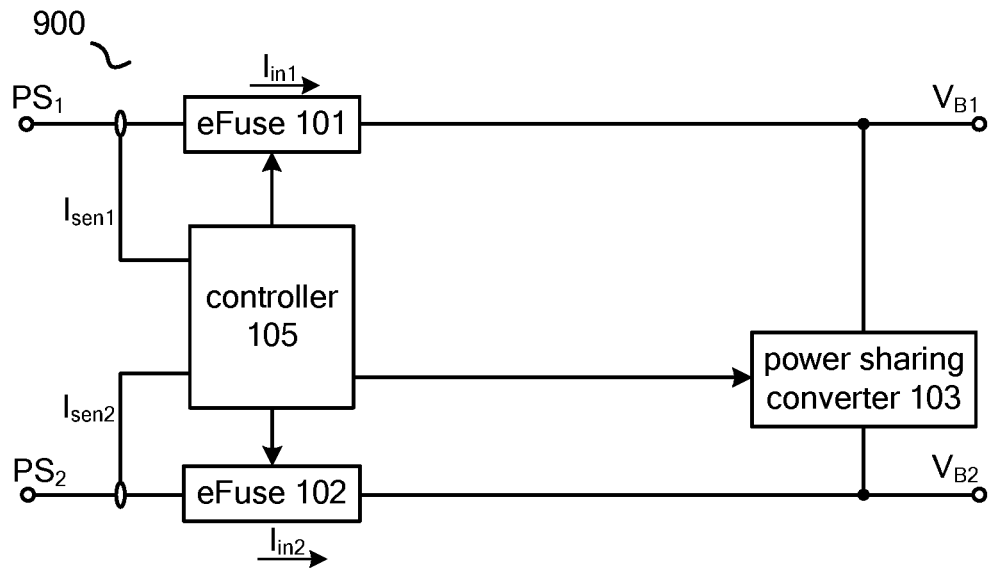
FIG. 9 schematically shows a power supply 900 in accordance with an embodiment of the present invention.

FIG. 9 schematically shows a power supply 900 in accordance with an embodiment of the present invention. In the example of FIG. 9, the power supply 900 comprises: a first eFuse 101, configured to deliver a first input power source PS1 to a first bus terminal, to provide a first bus voltage VB1, wherein the first eFuse 101 has a maximum rated current; a second eFuse 102, configured to deliver a second input power source PS2 to a second bus terminal, to provide a second bus voltage VB2, wherein the second eFuse 102 has a maximum rated current; a power sharing converter 103, coupled between the first bus terminal and the second bus terminal, to selectively provide an electrical path between the first bus terminal and the second bus terminal; and a controller 105, configured to control the first eFuse 101, the second eFuse 102, and the power sharing converter 103 in response to a current lint flowing through the first eFuse 101. In one embodiment, by saying that the power sharing converter 103 selectively provides an electrical path between the first bus terminal and the second bus terminal, it means that the electrical path may be turned on or off, depending on the specific situation. For example, as will be set forth later, the electrical path may be turned on when one of the currents flowing through the first eFuse 101 or the second eFuse 102 hits its own first current limit threshold, while the electrical path may be turned off when no currents flowing through the first eFuse 101 or the second eFuse 102 hits its own first current limit threshold.

In the power supply 900, if the current lint hits a first current limit threshold, the second input power source PS2 kicks in via the power sharing converter 103 to provide power support, wherein the first current limit threshold is lower than the maximum rated current of the first eFuse 101. For example, if a load coupled to the first bus terminal requires a high current, or more loads are coupled to the first bus terminal, causing the current flowing through the first eFuse 101 to hit the first current limit threshold, the power sharing converter 103 will be active (triggered) to turn on the electrical path, so that the second input power source PS2 provides additional power to the first bus terminal.

In this way, by setting the first current limit threshold being lower than the maximum rated current of the first eFuse 101, although the current flowing through the first eFuse 101 increases still for a period of duration between the moments when the current flowing through the eFuse hits the first current limit threshold and when the power sharing converter kicks in, due to the circuit delay, the current will be lower than the maximum rated current of the first eFuse 101. As a result of this, the response is faster and the overshoot of the eFuse can be avoided.

Persons of ordinary skill in the art will recognize that, the power sharing function may apply to both the first eFuse 101 and the second eFuse 102. That is, the power supply 900 illustrated in FIG. 9 may comprise the embodiment where the power supply 900 is such configured so that when any one of the currents flowing through the first eFuse 101 or the second eFuse 102 hits its first current limit threshold, the other input power source is capable of kicking in to provide power support. That is, if the current Iin2 flowing through the second eFuse 102 hits the first current limit threshold of the second eFuse 102, the first input power source PS1 kicks in via the power sharing converter 103 to provide power support. In such the embodiment, the power sharing converter 103 may comprise, for example, a buck-boost converter to accomplish such mutual sharing function.

In this way, by setting the second current limit threshold being lower than the maximum rated current of the second eFuse 102, although the current flowing through the second eFuse 102 increases still for a period of duration between the moments when the current flowing through the eFuse hits the second current limit threshold and when the power sharing converter kicks in, due to the circuit delay, the current will be lower than the maximum rated current of the second eFuse 102. As a result of this, the response is faster and the overshoot of the second eFuse 102 can be avoided.

Figure 10:
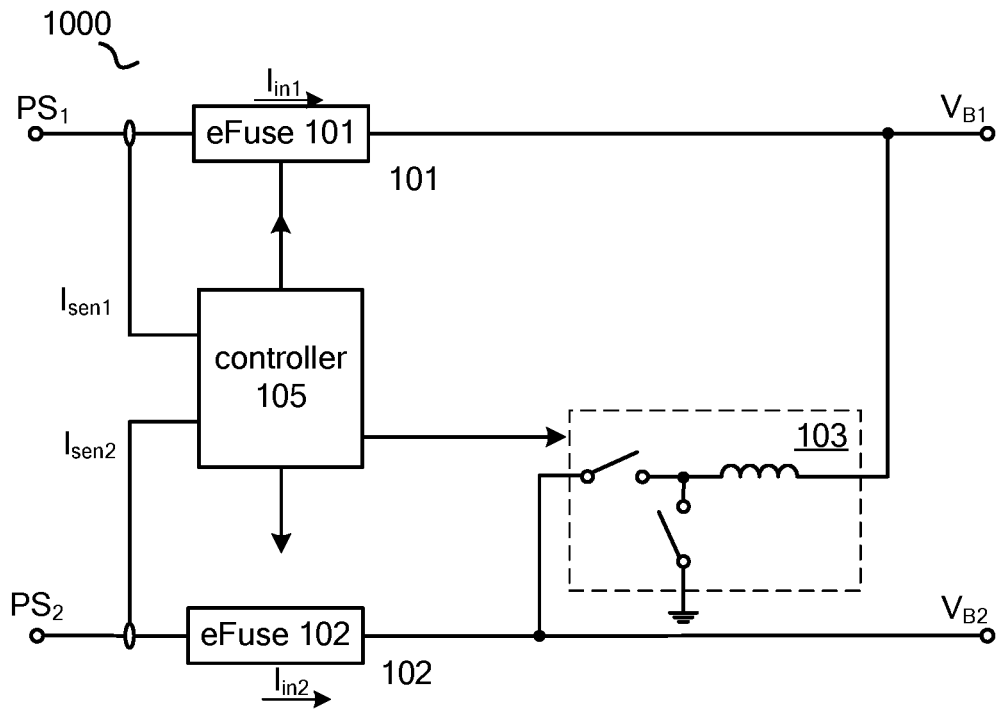
FIG. 10 schematically shows a power supply 1000 with a circuit configuration of the power sharing converter 103 in accordance with an embodiment of the present invention.

FIG. 10 schematically shows a power supply 1000 with a circuit configuration of the power sharing converter 103 in accordance with an embodiment of the present invention. In the example of FIG. 10, the power sharing converter 103 comprises a bidirectional buck-boost converter. For example, in one embodiment, if the first bus terminal is supported by the second bus voltage VB2, the power sharing converter 103 may operate as a buck converter to provide power support; and if the second bus terminal is supported by the first bus voltage VB1, the power sharing converter 103 may operate as a boost converter to provide power support. This operation may be under the situation that the voltage provided by the second input power source PS2 is higher than the voltage provided by the first input power source PS1.

Persons of ordinary skill in the art will also recognize that, the power sharing function may apply only to the first eFuse 101. That is, the power supply 900 illustrated in FIG. 9 may comprise the embodiment where the power supply 900 is such configured so that when the current flowing through the first eFuse 101 hits its first current limit threshold, the input power source PS2 kicks in to provide power support, but the first input power source PS1 does not kick in via the power sharing converter 103 to provide power support even if a current Iin2 flowing through the second eFuse 102 hits a first current limit threshold of the second eFuse 102. In such an embodiment, if the voltage provided by the first input power source PS1 is higher than the voltage provided by the second input power source PS2, the power sharing converter 103 may comprise, for example, a boost converter; and if the voltage provided by the first input power source PS1 is lower than the voltage provided by the second input power source PS2, the power sharing converter 103 may comprise, for example, a buck converter.

Figure 11:
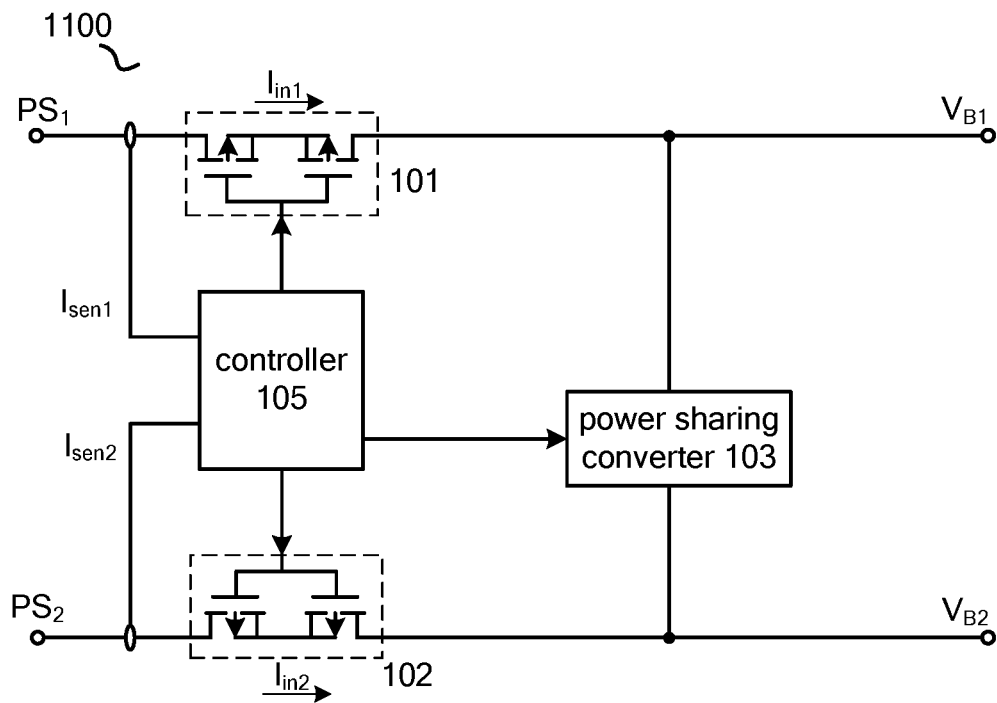
FIG. 11 schematically shows a power supply 1100 in accordance with an embodiment of the present invention.

FIG. 11 schematically shows a power supply 1100 in accordance with an embodiment of the present invention. In the example of FIG. 11, the first eFuse 101 and the second eFuse 102 each comprises a back to back switch to block reverse current.

Figure 12:
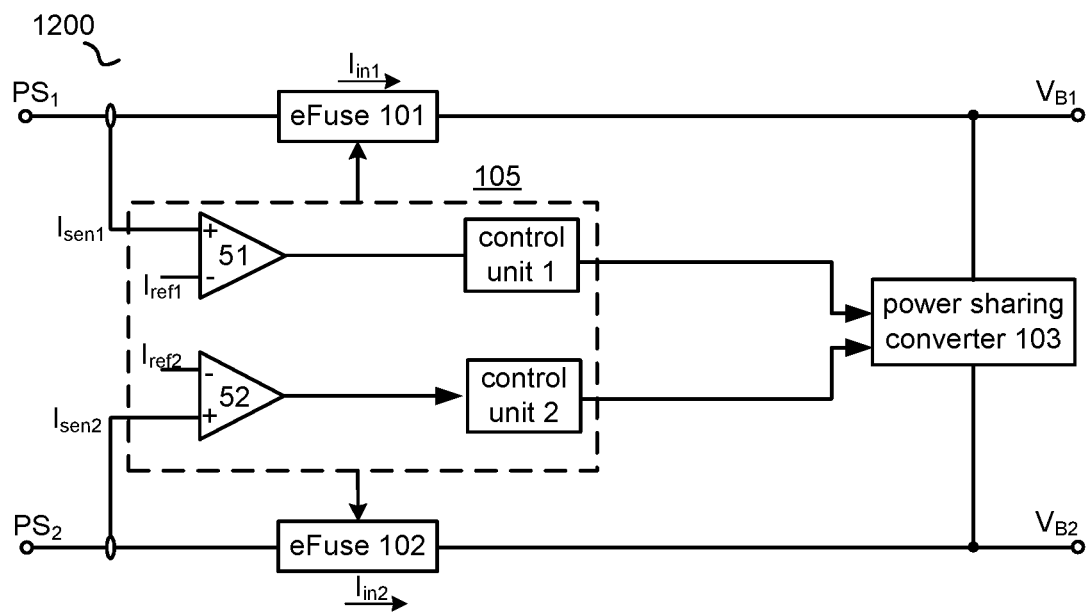
FIG. 12 schematically shows a power supply 1200 with a controller 105 in accordance with an embodiment of the present invention.

FIG. 12 schematically shows a power supply 1200 with a controller 105 in accordance with an embodiment of the present invention. In the example of FIG. 12, the controller 105 comprises: a first comparator 51, configured to compare a first sense signal Isen1 indicative of the current Iin1 flowing through the first eFuse 101 with a first reference signal Iref1 indicative of the first current limit threshold; and a first control unit 1, configured to control the power sharing converter 103 and the first eFuse 101 in response to the comparison result of the first comparator 51. In more detail, if the first current sense signal Isen1 is higher than the first reference signal Iref1, the first control unit 1 controls the power sharing converter 103 to supply power from the second input power source PS2 to the first bus terminal through the electrical path.

In the embodiment illustrated in FIG. 12, the controller 105 may further comprise a second comparator 52, configured to compare a second sense signal Isen2 indicative of the current Iin2 flowing through the first eFuse 102 with a second reference signal Iref2 indicative of the second current limit threshold; and a second control unit 2, configured to control the power sharing converter 103 and the second eFuse 102 in response to the comparison result of the second comparator 52. In more detail, if the second current sense signal Isen2 is higher than the second reference signal Iref2, the second control unit 2 controls the power sharing converter 103 to supply power from the first input power source PS1 to the second bus terminal through the electrical path.

Figure 13:
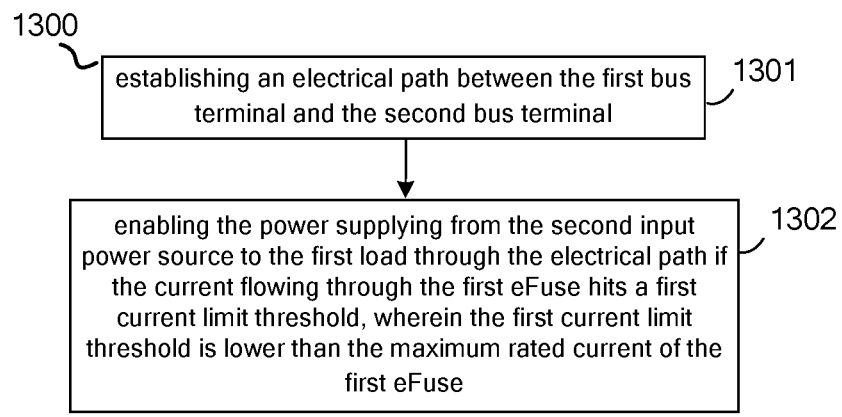
FIG. 13 schematically shows a flowchart 1300 of a method of controlling a power supply to supply power in accordance with an embodiment of the present invention.

FIG. 13 schematically shows a flowchart 1300 of a method of controlling a power supply to supply power in accordance with an embodiment of the present invention. The power supply comprises a first eFuse configured to deliver a first input power source to a first load at a first bus terminal, and a second eFuse configured to deliver a second input power source to a second load at a second bus terminal. The first eFuse and the second eFuse each has a maximum rated current. The method comprises:

Step 1301, establishing an electrical path between the first bus terminal and the second bus terminal.

Step 1302, enabling the power supplying from the second input power source to the first load through the electrical path if the current flowing through the first eFuse hits a first current limit threshold, wherein the first current limit threshold is lower than the maximum rated current of the first eFuse.

In one embodiment, the method further comprises: sensing the current flowing through the first eFuse and generating a first current sense signal indicative of the current flowing through the first eFuse; comparing the first current sense signal with a first reference signal indicative of the first current limit threshold and generating a comparison result; and controlling the power supplying from the second input power source to the first load through the electrical path. In further an embodiment, if the first current sense signal is higher than the first reference signal, the power is supplied from the second input power source to the first load through the electrical path.

In one embodiment, the method 1300 further comprises: enabling the power supplying from the first input power source to the second load through the electrical path if the current flowing through the second eFuse hits a second current limit threshold, wherein the second current limit threshold is lower than the maximum rated current of the second eFuse. In such an embodiment, the electrical path may be established by a bidirectional buck-boost converter coupled between the first bus terminal and the second bus terminal. In one embodiment, when the voltage provided by the first input power source is higher than the voltage provided by the second input power source, the power sharing converter works as a buck converter when the first input power source kicks in to provide power support, and the power sharing converter works as a boost converter when the second input power source kicks in to provide power support.

Figure 14:
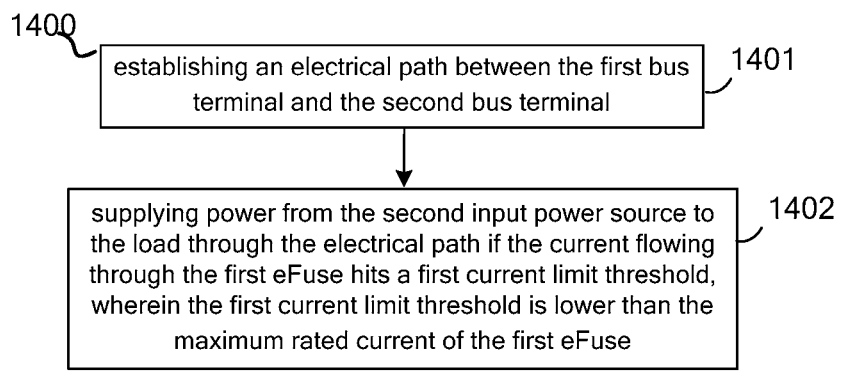
FIG. 14 schematically shows a flowchart 1400 of a method of controlling a power supply to supply power in accordance with an embodiment of the present invention.

FIG. 14 schematically shows a flowchart 1400 of a method of controlling a power supply to supply power in accordance with an embodiment of the present invention. The power supply comprises a first eFuse configured to deliver a first input power source to a first load at a first bus terminal and a second eFuse configured to deliver a second input power source to a second load at a second bus terminal. The first eFuse and the second eFuse each has a maximum rated current. The method comprises:

Step 1402, establishing an electrical path between the first bus terminal and the second bus terminal;

Step 1402, supplying power from the second input power source to the load through the electrical path if the current flowing through the first eFuse hits a first current limit threshold, wherein the first current limit threshold is lower than the maximum rated current of the first eFuse.

In one embodiment, the method 1400 further comprises: sensing the current flowing through the first eFuse and generating a first current sense signal indicative of the current flowing through the first eFuse; comparing the first current sense signal with a first reference signal indicative of the first current limit threshold and generating a comparison result; and controlling the power supplying from the second input power source to the first load through the electrical path. In further an embodiment, if the first current sense signal is higher than the first reference signal, the power is supplied from the second input power source to the first load through the electrical path.

In one embodiment, the method 1400 may further comprise: supplying power from the first input power source to the second load through the electrical path if the current flowing through the second eFuse hits a second current limit threshold, wherein the second current limit threshold is lower than the maximum rated current of the second eFuse. In such an embodiment, the electrical path may be established by a bidirectional buck-boost converter coupled between the first bus terminal and the second bus terminal. In one embodiment, when the voltage provided by the first input power source is higher than the voltage provided by the second input power source, the power sharing converter works as a buck converter when the first input power source kicks in to provide power support, and the power sharing converter works as a boost converter when the second input power source kicks in to provide power support.

In the illustrated embodiments of FIGS. 13 and 14, in one embodiment, the first eFuse and the second eFuse each comprises a back to back switch to block reverse current. In one embodiment, the electrical path is established by a bidirectional buck-boost converter.

This written description uses examples to disclose the invention, including the best mode, and also to enable a person skilled in the art to make and use the invention. The patentable scope of the invention may include other examples that occur to those skilled in the art.

What is claimed is:

1. A power supply, comprising:
a first eFuse, configured to deliver a first input power source to a first bus terminal, to provide a first bus voltage, wherein the first eFuse has a maximum rated current;
a second eFuse, configured to deliver a second input power source to a second bus terminal, to provide a second bus voltage, wherein the second eFuse has a maximum rated current;
a power sharing converter, coupled between the first bus terminal and the second bus terminal, to selectively provide an electrical path between the first bus terminal and the second bus terminal; and
a controller, configured to control the first eFuse, the second eFuse and the power sharing converter in response to a current flowing through the first eFuse;
wherein if the current flowing through the first eFuse hits a first current limit threshold, the second input power source kicks in via the power sharing converter to provide power support, wherein the first current limit threshold is lower than the maximum rated current of the first eFuse.

2. The power supply of claim 1, wherein the controller comprises a first comparator configured to compare a first sense signal indicative of the current flowing through the first eFuse with a first reference signal indicative of the first current limit threshold; and a first control unit, configured to control the power sharing converter and the first eFuse in response to the comparison result of the first comparator.

3. The power supply of claim 2, wherein if the first current sense signal is higher than the first reference signal, the first control unit controls the second input power source to supply power to the first load through the electrical path.

4. The power supply of claim 1, wherein if the current flowing through the second eFuse hits a second current limit threshold, the first input power source kicks in via the power sharing converter to provide power support, wherein the second current limit threshold is lower than the maximum rated current of the second eFuse.

5. The power supply of claim 4, wherein the power sharing converter comprises a bidirectional buck-boost converter.

6. The power supply of claim 5, wherein when the voltage provided by the first input power source is higher than the voltage provided by the second input power source, the power sharing converter works as a buck converter when the first input power source kicks in to provide power support, and the power sharing converter works as a boost converter when the second input power source kicks in to provide power support.

7. The power supply of claim 4, wherein the controller comprises a second comparator configured to compare a second sense signal indicative of the current flowing through the second eFuse with a second reference signal indicative of the second current limit threshold; and a second control unit, configured to control the power sharing converter and the second eFuse in response to the comparison result of the second comparator.

8. The power supply of claim 7, wherein if the second current sense signal is higher than the second reference signal, the second control unit controls the first input power source to supply power to the second load through the electrical path.

9. The power supply of claim 1, wherein the first eFuse and the second eFuse each comprises a back to back switch.

10. A method of controlling a power supply to supply power, wherein the power supply comprises a first eFuse configured to deliver a first input power source to a first load at a first bus terminal and a second eFuse configured to deliver a second input power source to a second load at a second bus terminal, and wherein the first eFuse and the second eFuse each has a maximum rated current, the method comprising:
establishing an electrical path between the first bus terminal and the second bus terminal;
enabling the power supplying from the second input power source to the first load through the electrical path if the current flowing through the first eFuse hits a first current limit threshold, wherein the first current limit threshold is lower than the maximum rated current of the first eFuse.

11. The method of claim 10, wherein the method further comprises:
sensing the current flowing through the first eFuse and generating a first current sense signal indicative of the current flowing through the first eFuse;
comparing the first current sense signal with a first reference signal indicative of the first current limit threshold and generating a comparison result; and
controlling the power supplying from the second input power source to the first load through the electrical path based on the comparison result.

12. The method of claim 11, wherein if the first current sense signal is higher than the first reference signal, the power is supplied from the second input power source to the first load through the electrical path.

13. The method of claim 10, wherein the method further comprises enabling the power supplying from the first input power source to the second load through the electrical path if the current flowing through the second eFuse hits a second current limit threshold, wherein the second current limit threshold is lower than the maximum rated current of the second eFuse.

14. The method of claim 13, wherein the electrical path is established by a bidirectional buck-boost converter coupled between the first bus terminal and the second bus terminal.

15. The method of claim 14, wherein when the voltage provided by the first input power source is higher than the voltage provided by the second input power source, the power sharing converter works as a buck converter when the first input power source kicks in to provide power support, and the power sharing converter works as a boost converter when the second input power source kicks in to provide power support.

16. A method of controlling a power supply to supply power, wherein the power supply comprises a first eFuse configured to deliver a first input power source to a first load at a first bus terminal, and a second eFuse configured to deliver a second input power source to a second load at a second bus terminal, and wherein the first eFuse and the second eFuse each has a maximum rated current, the method comprising:
establishing an electrical path between the first bus terminal and the second bus terminal;
supplying power from the second input power source to the first load through the electrical path if the current flowing through the first eFuse hits a first current limit threshold, wherein the first current limit threshold is lower than the maximum rated current of the first eFuse.

17. The method of claim 16, wherein the method further comprises:
- sensing the current flowing through the first eFuse and generating a first current sense signal indicative of the current flowing through the first eFuse;
- comparing the first current sense signal with a first reference signal indicative of the first current limit threshold and generating a comparison result; and
- controlling the power supplying from the second input power source to the first load through the electrical path based on the comparison result.

18. The method of claim 16, wherein the method further comprises supplying power from the first input power source to the second load through the electrical path if the current flowing through the second eFuse hits a first current limit threshold, wherein the second current limit threshold is lower than the maximum rated current of the second eFuse.

19. The method of claim 18, wherein the electrical path is established by a bidirectional buck-boost converter coupled between the first bus terminal and the second bus terminal.

20. The method of claim 19, wherein when the voltage provided by the first input power source is higher than the voltage provided by the second input power source, the power sharing converter works as a buck converter when the first input power source kicks in to provide power support, and the power sharing converter works as a boost converter when the second input power source kicks in to provide power support.

* * * * *